US006922493B2

(12) United States Patent
Stanek

(10) Patent No.: US 6,922,493 B2
(45) Date of Patent: Jul. 26, 2005

(54) METHODS AND ARRANGEMENTS TO ENHANCE GRIDLOCKING

(75) Inventor: Clay J. Stanek, Poway, CA (US)

(73) Assignee: Anzus, Inc., San Diego, CA (US)

( * ) Notice: Subject to any disclaimer, the term of this patent is extended or adjusted under 35 U.S.C. 154(b) by 685 days.

(21) Appl. No.: 10/094,037

(22) Filed: Mar. 8, 2002

(65) Prior Publication Data

US 2003/0169945 A1 Sep. 11, 2003

(51) Int. Cl.$^7$ .................................................. G06K 9/32
(52) U.S. Cl. ....................... 382/293; 382/294; 382/284; 382/282; 358/540; 358/453; 358/450
(58) Field of Search .................................... 382/151, 216, 382/278, 282, 284, 293, 294; 358/540, 450, 453

(56) References Cited

U.S. PATENT DOCUMENTS

| | | |
|---|---|---|
| 4,832,447 A | 5/1989 | Javidi |
| 5,111,515 A | 5/1992 | Javidi |
| 5,119,443 A | 6/1992 | Javidi et al. |
| 5,367,579 A | 11/1994 | Javidi et al. |
| 5,485,312 A | 1/1996 | Horner et al. |
| 5,513,854 A * | 5/1996 | Daver ........................ 700/91 |
| 5,600,373 A | 2/1997 | Chui et al. |
| 5,699,449 A | 12/1997 | Javidi |
| 5,794,173 A | 8/1998 | Schutte |
| 5,798,942 A * | 8/1998 | Danchick et al. ............. 342/96 |
| 5,841,907 A | 11/1998 | Javidi et al. |
| 5,903,648 A | 5/1999 | Javidi |
| 6,002,773 A | 12/1999 | Javidi |
| 6,021,378 A | 2/2000 | Reiter et al. |
| 6,072,504 A * | 6/2000 | Segen ........................ 345/474 |
| 6,104,336 A | 8/2000 | Curran et al. |
| 6,104,345 A | 8/2000 | Tweg et al. |
| 6,202,033 B1 | 3/2001 | Lange |
| 6,225,942 B1 | 5/2001 | Alon |
| 6,233,357 B1 | 5/2001 | Li et al. |
| 6,282,496 B1 | 8/2001 | Chowdhary |
| 6,289,132 B1 | 9/2001 | Goertzen |
| 6,317,688 B1 | 11/2001 | Bruckner et al. |
| 6,332,030 B1 | 12/2001 | Manjunath et al. |
| 6,343,155 B1 | 1/2002 | Chui et al. |
| 6,449,382 B1 * | 9/2002 | Ciccolo et al. ............. 382/103 |

OTHER PUBLICATIONS

Tien–Hsin Chao & Hua–Kuang Liu, Real–time Optical Holographic Tracking of Multiple Objects, Applied Optics, vol. 28, No. 2, Jan. 15, 1989, pp. 226–231.

Eugene Hecht, Adelphi University, Optics, Third Edition, pp. 437–438, 442,532,456,457,602–604, Addison–Wesley.

Kenneth H. Fielding, Joseph L. Horner, Charles K. Makekau, Optical Fingerprint Identificatin by Binary Joint Transformation, Optical Engineering, vol. 30, No. 12, Dec. 1991, pp. 1958–1961.

(Continued)

Primary Examiner—Bhavesh M. Mehta
Assistant Examiner—Yosef Kassa
(74) Attorney, Agent, or Firm—Blakely Sokoloff Taylor & Zafman, LLP.

(57) ABSTRACT

The present invention is in the area of gridlocking or sensor registration. Embodiments encompass systems of process and/or equipment to format tracks from more than one sensor to be compared or correlated by statistical and/or optical correlation techniques to provide coordinate transformations between one or more of the sensors based upon the objects or a subset of the objects tracked by each sensor. Embodiments may take into account determinations or calculations regarding tracks describing the same object by different sensors and may take into account errors in those determinations by comparing pairs of tracks associated with more than one object at the same or substantially the same time. Further, many embodiments comprise software that can execute on a laptop, desktop, or similar computer.

30 Claims, 10 Drawing Sheets

OTHER PUBLICATIONS

Subhasis Saha, Image Compression—from DCT to Wavelets: A Review, ACM Crossroads Student Magazine, http://www.acm.org/crossroads/xrds6-3/sahaimgcoding.html., pp. 1–14.

H. John Caulfield, Templates for Invention in the Mathematical and Physical Sciences with Applications to Optics, Proceedings of SPIE vol. 4392, 2001, pp. 104–117, SPIE.

Eddy C. Tam, Francis T. S. Yu, Don A. Gregory, Richard D. Juday, Autonomous Real–Time Object Tracking with an Adaptive Joint Transform Correlator, Optical Engineering, vol. 29, No. 4, Apr. 1990, pp. 314–320.

Yu Hen Hu, University of Wisconsin, Madison, Visual Artifact Reduction By Post–Processing, Presented at Carnegie Mellon University, Dept. ECE, Nov. 1, 2001, pp.–69.

Shahriar Mirabbasi, On the Design of Multirate Filter Banks by H ~ Optimization, Master of Applied Science, 1997, Dept. of Electrical & Computer Engineering, University of Toronto, pp.–37.

C. S. Weaver & J. W. Goodman, A Technique for Optically Convolving Two Functions, Applied Optics, vol. 5, No. 7, Jul. 1966, pp. 1248, 1249.

Ali M. Reza, Wavelet Characteristics, Spire Lab, UWM, Oct. 19, 1999 White Paper, pp. 1–9.

http://www.diffuse.org/compress.html, Diffuse Guide to Image Compression, pp. 1–8.

Edward H. Adelson, Subband Coring for Image Noise Reduction, Internal Report, RCA David Sarnoff Research Center, Nov. 26, 1986, pp.–14.

Julien Reichel, Gloria Menegaz, Marcus J. Nadenau & Murat Kunt, Integer Wavelet Transform for Embedded Lossy of Lossless Image Compression, Signal Processing Laboratory, Swiss Federal Institute of Technology, Lausanne, Switzerland, pp. 1–9.

Shuo–Yen Choo & Gregory Chew, EE362—JPEG 2000 and Wavelet Compression, http://www-ise.stanford.edu/class/psych221/00/shuoyen, pp. 1–23.

Cardinal Warde & Arthur D. Fisher, Spatial Light Modulators: Applications and Functional Capabilities, Optical Signal Processing, Copyright 1987 by Academic Press, Inc., pp. 477–523.

Martin Vetterli & Jelena Kovacevic, "Wavelets and Subband Coding," Wavelets, Filter Banks and Multiresolution Signal Processing, 1995, pp. 1–13, Prentice Hall.

Bahram Javidi & Chung–Jung Kuo, Joint Transform Image Correlation Using a Binary Spatial Light Modulator at the Fourier Plane, Applied Optics, vol. 27, No. 4, Feb. 15, 1988, pp. 663–665.

Henri Rajbenbach, Dynamic Holography in Optical Pattern Recognition, SPIE vol. 2237, Optical Pattern Recognition V (1994), pp. 329–346, SPIE.

Bahram Javidi, Processing for Encryption and Security Systems, Optics & Photonics News, Mar. 1997, pp. 29–33.

Bahram Javidi & Joseph L. Horner, Single Spatial Light Modulator Joint Transform Correlator, Applied Optics, vol. 28, No. 5, Mar. 1, 1989, pp. 1027–1032.

Bahram Javidi, Nonlinear Joint Power Spectrum Based Optical Correlation, Applied Optics, vol. 28, No. 12, Jun. 15, 1989, pp. 2358–2367.

Bahram Javidi, Jun Wang & Qing Tang, Nonlinear Joint Transform Correlators, Pattern Recognition, vol. 27, No. 4, Copyright 1994 Pattern Recognition Society, Printed in Great Britian, pp. 523–542.

* cited by examiner

METHODS AND ARRANGEMENTS TO ENHANCE GRIDLOCKING

FIELD OF INVENTION

The present invention is in the field of processing data from sensors. More particularly, the present invention provides a method, apparatus, system, and machine-readable medium to format tracks from sensors such as radars, global positioning systems, laser target designators, seismic sensors, and the like, to enhance gridlocking or sensor registration.

BACKGROUND

Gridlocking, or sensor registration, is part of a process for combining objects (tracks) from more than one sensor in a consistent manner. This process, known as the correlation and gridlocking process, is intended to provide a single integrated picture (SIP) for the end user. The goal of gridlocking is to determine the difference in position and orientation of the sensors, thereby reducing navigation errors and sensor misalignment errors so that one sensor's track data is accurately transformed into another sensor's coordinate system, e.g. radar-aligned.

One problem involved with gridlocking more than one sensor covering adjacent and overlapping areas or volumes of space is that each sensor typically determines the positions of objects based upon the distance of the object from that sensor and the orientation of that sensor, meaning it is a relative measurement as that coordinate frame may be in motion relative to some other inertial frame. The exact distance and orientation of each sensor may not be available, especially in applications wherein one or more sensors may change positions over a period of time. For example, a ship may comprise a radar and the ship may move forward and roll, causing the position and orientation of the radar to change over time. A possible solution on the radar end is to provide a global positioning system and gyroscope with the radar. The global positioning system provides an absolute position for the radar usually within 0.2 to 100 meters in the ellipsoidal plane of the earth (much less accuracy in altitude) and the gyroscopic system may provide an orientation within some degree of accuracy (from milliradians to degrees depending upon the application). However, providing real-time positions and orientations for more than one radar on the radar end has a relatively significant margin of error for many applications as the probability distributions of these radars errors is difficult to characterize, leading to sub-optimal filter performance in tracking these coordinate frame differences.

The output of a gridlocking or sensor registration process provides positional adjustments (PADs) for tracks to a system (such as a computer with a real-time, updateable geographic map) to model the theater, or the geographical area of interest, which encompasses a greater area than that of an individual radar system. Furthermore, these tracks are aligned with respect to some common coordinate frame with a smaller amount of bias error than would normally be possible without any gridlocking facility. Data is collected by a number of radars for the positions of planes, ships, ground vehicles, troop movements, or other targets. An increase in the data that is collected and processed about positions of the objects at a given moment in time can potentially increase the accuracy of a model or presentation of the positions of the objects in the theater. However, a limitation on computing power and time to describe the positions of the objects in the theater in a coherent way significantly impacts the amount of data that is processed and vice versa.

In a closed-loop correlation and gridlocking system with feedback, computers such as Cray computers, reduce the error in positions of objects within the theater with respect to one another by searching for the minimum of a complicated surface describing the error in registration. Most statistical techniques describe the bias error in a mean-square error sense. There are numerous techniques for minimizing this mean-square error, but the final result in any approach is an optimum location in this parameter space of possible rotations and offsets corresponding to the minimum error. In closed-loop gridlock operation, the bias vector is tracked in a similar manner to that of the state of any given track. Typically, the bias error vector is estimated with the aid of a Kalman filter. This technique requires knowledge of the probability distribution of the measurement noise and process noise as well as characterization of the measurement to state transfer function and state-space matrix, which attempts to describe how the bias error vector evolves with time. Using a predictive-corrective filter structure, the Kalman filter is able to combine bias error vector input from individual track pair combinations and use this information in a manner that factors into account the uncertainty in the input. This is seen as just a real-time implementation of the scheme developed by Gauss at the turn of the 19th century in the pursuit to estimate the position of stellar objects, known as the least-square problem with weighted data. The result is a normalized or average coordinate transformation including a translation and rotation correction that is calculated for transforming tracks of the first radar to the same coordinate system, within a margin of error, as the tracks of the second radar. By normalizing the coordinate transformations of the tracks cross-correlated individually, however, the coordinate transformation includes track data from noisy or erroneous tracks. For example, the Cray computer receives the position and velocity of a plane from the first radar based upon or with respect to a position and azimuth from a global positioning system and compass system for the first radar. The computer system also receives a position and velocity for the object from a second radar wherein the object is determined to be the same plane. By statistical techniques, the Cray computer determines a distance correction and azimuthal or rotational correction to minimize the difference in position and velocity reported for the object by the two tracks. After two or more distance corrections and rotational corrections are calculated, the filter effectively normalizes the distance corrections and rotational corrections. That is, the state of the actual offset and rotational corrections needed must be estimated from the noisy measurements, with the measurements being derived from the set of determined track pairs. However, current systems incorporate error involved with incorrect determinations that the tracks describe the same object. Further, the computing power and time to evaluate each track individually is significant and increases with the square of the number of tracks to compare.

BRIEF FIGURE DESCRIPTIONS

In the accompanying drawings, like references may indicate similar elements:

Skilled artisans appreciate that elements in the figures are illustrated for simplicity and clarity and have not necessarily been drawn to scale. For example, the dimensions of some of the elements in the figures are exaggerated relative to other elements to help to improve understanding of embodiment(s) of the present invention

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Embodiments encompass systems of process and/or equipment to format tracks from more than one sensor to be correlated or compared by statistical and/or optical correlation techniques to provide coordinate transformations between one or more sensors based upon the objects or a subset of the objects tracked by each sensor. In many of the embodiments, the sensors may comprise radars, global positioning systems, laser target designators, seismic sensors or systems of seismic sensors comprising hydrophones and geophones, and other similar systems. Low latencies involved with correlating and gridlocking data, through the use of correlation images, may facilitate the use of this wider variety of sensors. A statistical technique may comprise Kalman filtering, probabilistic data association filtering, Neyman-Pearson hypothesis testing, and a Munkres assignment, or the like. Optical techniques may comprise frequency plane correlation, electrically addressed spatial light modulation and optically addressed spatial light modulation, joint transform correlation, or a hybid correlation. One such technique, incorporated herein by the following reference, s described in a co-pending patent application entitled "Gridlocking and Correlation Methods and Arrangements", Ser. No. 10/093,535, filed on the same day, an assigned to Anzus, Inc. Embodiments may also take into account determinations or calculations regarding tracks from different sensors that describe the same object and errors in those determinations or calculations by comparing pairs of tracks associated with ore than one object at the same time or substantially the same time. Further, many embodiments comprise software that can execute on a laptop, desktop, or similar computer.

Figure 1:
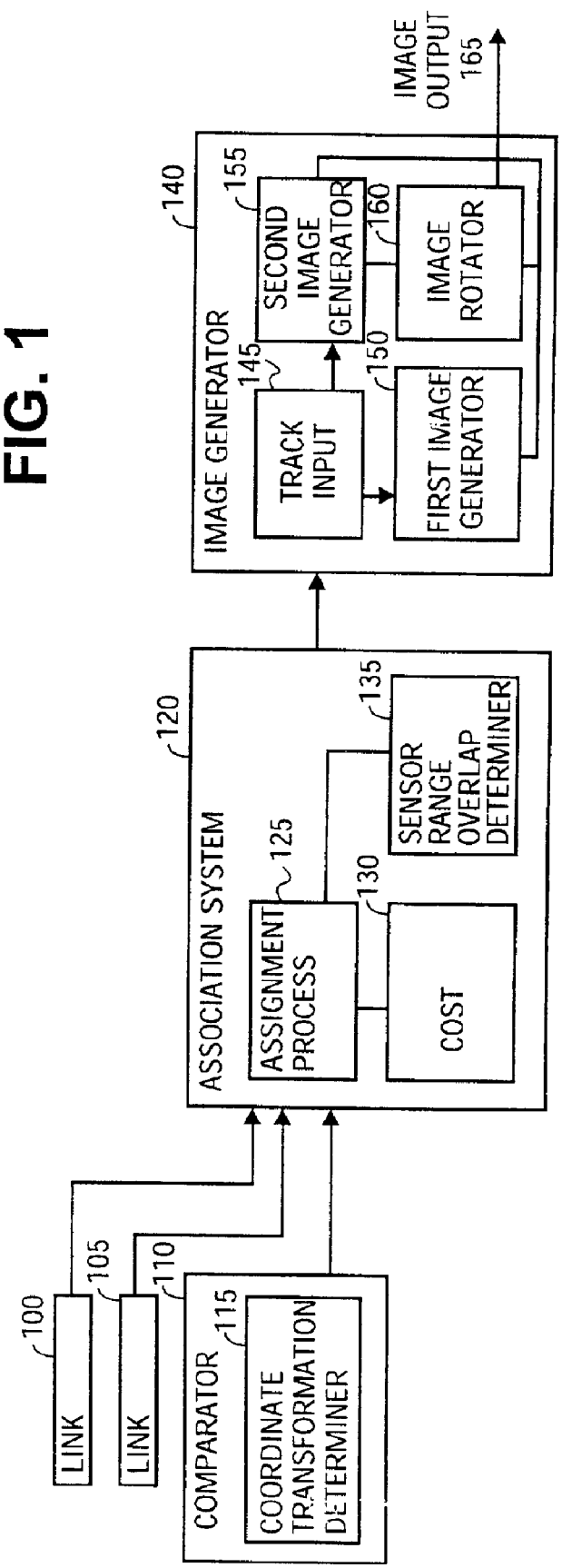
FIG. 1 depicts an embodiment of a system to format tracks from sensors to enhance gridlocking.

Referring now to FIG. 1, there is shown an embodiment of a system to format tracks from sensors to enhance gridlocking. The embodiment comprises link 100, link 105, comparator 110, association system 120, image generator 140, and output 165. Links 100 and 105 comprise data links that may transmit tracks from one or more sensors to the association system 120. A track may comprise a position of an object within the range of the reporting sensor and may comprise a track identification that may identify the sensor or associate a sensor with the track. Some tracks may comprise speed and direction data or velocity data about the object. For example, a sensor may comprise a Doppler radar or a seismic sensor that may determine the velocity of an object with reflected sound waves, particle velocities or changes in hydrostatic pressure propagated through the air, water, and/or earth. In many embodiments, the tracks may be time-adjusted so that the tracks from two different sensors may indicate positions at the same moment in time. In several embodiments, a rough coordinate transformation, possibly based upon global positioning systems and compass systems, may reorient the origin of the local coordinate system of each track to a global coordinate system such that the coordinate systems of the tracks may substantially align.

Comparator 110 may determine a coordinate transformation to adjust, refine, or transform the coordinate systems associated with the tracks to a coordinate system closer to the equivalent of the global coordinate system. In many embodiments, data to determine the coordinate transformation may comprise data from a correlation system and the basis for the data may comprise a comparison of prior sets of tracks from the same sensors. The comparator 110 may comprise a coordinate transformation determiner 115 to interpret the data. The data may comprise, for example, the results of a cross-correlation between a reference or first image and a second image. The results may comprise a correlation rating associated with an image rotated by an angle and an offset. Coordinate transformation determiner 115 may calculate a coordinate transformation in a manner similar to the manner described in FIG. 6, based upon the offset, angle, and the tracks used to generate the image rotated by the angle.

Association system 120 may receive sets of tracks from links 100 and 105, and may determine and/or select tracks from the sets of tracks to transmit or forward to image generator 140. In many embodiments, the selected tracks may comprise a subset of the tracks received. Association system 120 may select the subset of tracks to reduce the number of tracks for objects unique to any one sensor or outside an overlapping area of two sensors. For example, association system 120 may receive tracks that may correspond to an object as sensed by a first sensor and a second sensor. In some of these embodiments, association system 120 may further receive the tracks as a matched pair or group of tracks, or group of matched pairs of tracks.

In other embodiments, association system 120 may receive a cost matrix or costs associated with a track or group of tracks to assist in determining the likelihood that two or more tracks comprise tracks for the same object or that the tracks are not unique to an individual sensor with respect to the second sensor or a group of sensors. For example, association system 120 may receive a pair of tracks from links 100 and 105 via a correlation system to indicate that the pair of tracks comprise a first track from a first sensor for an object and a second track from a second sensor for the same object or for an object determined to be the same object within a margin of error. Association system 120 may forward the paired or selected tracks to image generator 140.

In further embodiments, association system 120 may comprise assignment process 125, cost 130, and sensor range overlap determiner 135. Assignment process 125 may comprise a Munkres assignment algorithm, or the like, to determine that multiple tracks may comprise data about the same object from different sensors. Cost 130 comprises the costs of associating the tracks with respect to a cost function. This cost function is many times based on likelihood ratios, which express the probability a hypothesis is true to the probability it is false. For example, a basis for a cost determination may comprise the distance between two tracks; the closer the distance, the higher the probability they are the same track. The basis for some costs may comprise the speed and/or direction, or some combination of or relation based upon the position, speed, and/or direction indicated by two tracks. In many embodiments, association system 120 may compare a cost of associating a first track with a second track against another cost, wherein the first track is a track from a first sensor and the second track is a track from the second sensor, and select matching tracks based upon the costs. Embodiments may match one track from a sensor overlapping an area for many types of sensors wherein the sensors are less likely or not likely to have two or more tracks for the same object. After the comparison, tracks that are not matched may be unique to an individual sensor and may not be forwarded to image generator 140.

In further embodiments, cost 130 may comprise a reference cost or reference cost curve. In many of these embodiments, the reference cost or reference cost curve may be advantageous as a cost threshold that may be met for an association to be made. Association system 120 may compare the tracks to determine whether the cost of the association between tracks is less than the reference cost or reference cost curve. When the cost of associating a first track and a second track, for example, is greater than the reference cost, association system 120 may not select the first track and/or the second track to generate an image.

In some embodiments, association system 120 may receive the results of a comparison and/or a coordinate transformation from comparator 110 to modify incoming tracks from links 100 and 105. In other embodiments, the coordinate transformation may transmit to a system designed to match tracks or associate tracks of different sensors that may comprise data about the same object, such as a correlation system to provide matched pairs or groups of tracks for gridlocking or sensor registration, to transform the coordinate systems of tracks prior to matching or associating tracks from links 100 and 105.

Sensor range overlap determiner 135 may, in some embodiments, determine which tracks are within the ranges of both the first sensor and the second sensor; an overlap area. Sensor range overlap determiner 135 may select the tracks within the overlap area to generate images for gridlocking. For example, some embodiments may generate images to compare sets of tracks from two or more sensors against a set of tracks from a reference or selected reference sensor. Sensor range overlap determiner 135 may have or receive information regarding the location and orientation of one or more the sensors including the reference sensor and may estimate or determine a subset of the tracks from one or more of the sensors that reside or likely reside within the area of overlap. After determining the subset(s) tracks in or likely within the overlap, association system 120 may forward the set or subset of tracks to image generator 140 to generate images in a format for gridlocking.

Image generator 140 may generate images or signals to display images for sets of tracks for comparison to determine a relationship between the sensors such as a difference in rotation and/or a distance between the sensors. The images may facilitate comparison of multiple tracks of a sensor against multiple tracks of another sensor or other sensors by pattern recognition. Image generator 140 may comprise track input 145, first image generator 150, second image generator 155, and image rotator 160. Other embodiments may comprise a single image generator for more than one sensor and, in many embodiments, the same image generator(s) that generate the images to compare against the reference image may generate an image for the reference or first image.

Track input 145 may receive a first set of tracks from a first sensor and a second set of tracks from a second sensor. In many embodiments, image generator 140 may receive sets of tracks from more than one sensor to generate images to compare against the tracks from the first sensor. In some embodiments, image generator 140 may receive sets of tracks to compare and then may determine which sensor or the sets of tracks of a sensor may comprise tracks to generate the reference image, by a technique such as a round-robin technique, to facilitate comparisons with more than one of the sensors as reference sensors.

Track input 145 may receive tracks comprising subsets of the sets of tracks received from links 100 and 105 via association system 120. The tracks received from the first sensor may comprise a first track and a second track, wherein the first track is a track of the first sensor and the second track is a track of the second sensor. The first track and second track may also comprise tracks of or associated with the same object. Track input 145 may determine the tracks of the first sensor and direct those tracks to the first image generator 150, as well as the tracks from the second sensor and direct those tracks to the second image generator 155. In other embodiments, track input 145 may split the burden of generating images between the first image generator 150 and the second image generator 155, wherein tracks for more than two images may be received and generated substantially simultaneously.

First image generator 150 may generate an image for the reference image and/or generate an image from tracks of a sensor in parallel with generation of an image by second image generator 155. Generation of the first image and the second image may produce a feature in the first image based upon the first track that is substantially similar or the same as a feature in the second image based upon the second track. In situations wherein tracks from the first sensor and tracks from the second sensor comprise data about several of the same objects, the tracks may produce similar features in the first image and the second image. A high correlation rating may result from a large number of features that are common to or similar within both the first image and the second image, particularly when the number of common features is large with respect to the number of features generated by tracks of objects that may not be common to both the first image and the second image.

First image generator 150 may generate a first image based upon the position indicated by tracks for a first sensor and the image resulting from the first feature or a combination of features may result in a substantially unique pattern within the first image. Further embodiments may base the first image upon speed and/or direction data in a track. For example, the first sensor may transmit multiple tracks and first image generator 150 may generate or locate a feature such as a dot, circle, polygon, sphere, or the like, of substantially equivalent size, at each position or at a substantially uniform offset from each position that is indicated by the tracks.

Figure 3A:
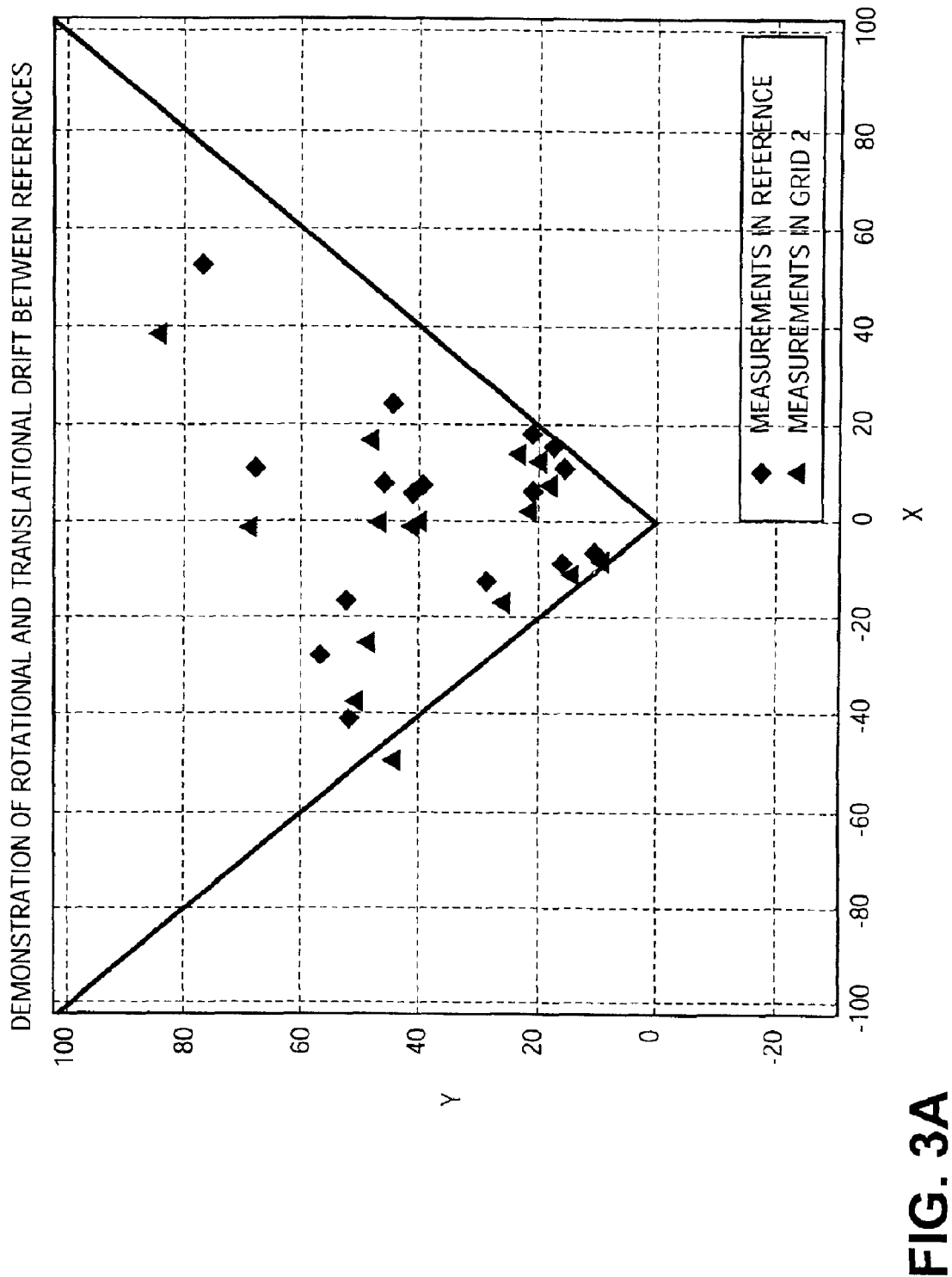
FIGS. 3–4 depict embodiments of an image as a format for tracks from sensors to enhance gridlocking.

Second image generator 155 may generate an image in the same or a similar manner as the first image, to generate an image having substantially similar features. For instance, second image generator 155 may receive a set of tracks indicating positions that are the same as the positions indicated by the tracks received for the first image except for a rotation and/or translation. As described for the first image, generating the second image may comprise generating a feature such as a dot, circle, polygon, sphere, or the like, at each position or an offset from each position indicated by the tracks. In FIG. 3A, for example, the first image may comprise the circles and the second image, interposed on the first image, may comprise the triangles. Each circle may represent a position indicated by a track of the first sensor and each triangle may represent a position indicated by a track of the second sensor. In other embodiments, locating circles at positions indicated by the tracks, substantially equivalent in dimension, may generate the first image and the second image.

Figure 3B:
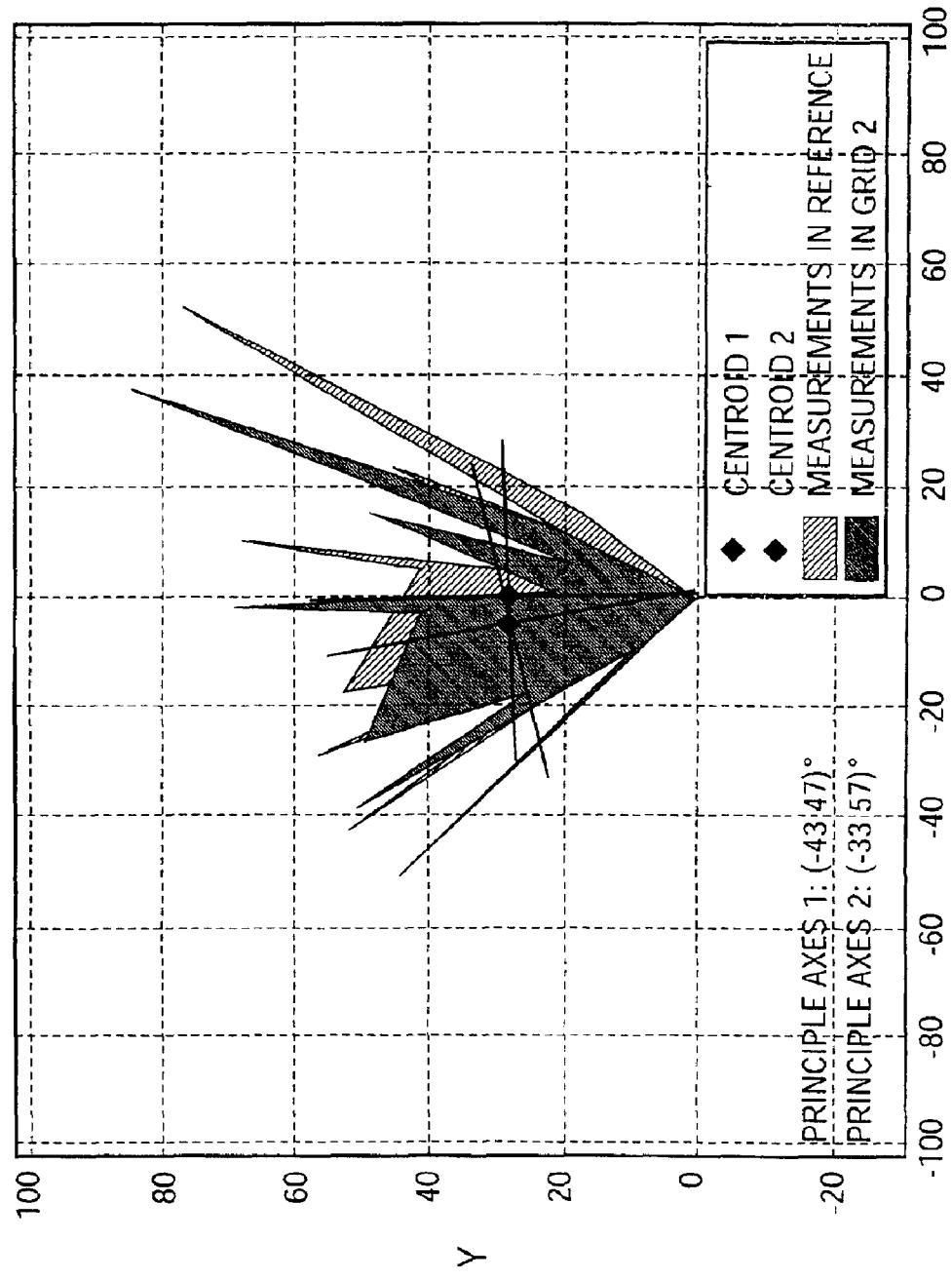

In further embodiments, as exemplified in FIG. 3B, a polygon or solid polygon may be generated for the first image and second image based upon the positions of the tracks. FIG. 3B comprises an alternate first image behind an alternate second image, wherein both alternate images are based upon the same tracks as the tracks used to generate FIG. 3A. However, in FIG. 3B, the positions of the sets of tracks are used as vertices to generate polygons. The second image may be generated by connecting the positions indicated by tracks received from the second sensor with lines starting from the origin of the second image, or the relative location of the second sensor from the tracks, in an order of ascending angle and ascending distance from the origin. For example, when the tracks received or selected for generation of the second image may comprise a track offset from the origin by a distance of 15 units at an angle of 12 degrees, another track offset by 20 units at an angle of 12 degrees, and a third track offset by 11 units at an angle of 30 degrees, a line may be generated from the origin to the track at 15 units, from the track at 15 units to the track at 20 units, from the track at 20 units to the track at 11 units, and from the track at 11 units to the origin. Including the origin as the starting and ending point of the polygon may maintain a convex shape for tracks with 180 degrees of the origin. However, the lines to the origin may also add an error to an image such as the first image when there is a translation error or difference between the coordinate system of the first image and the coordinate system of the second image. Many embodiments may compensate for this introduced error by rotationally scaling the targets of interest to space around a full $2\pi$ radians with the node at the origin removed, keeping the polygon convex. In several of these embodiments, the first target may be located by sorting in $\theta$, choosing the target closest to $\theta_1=0$, and choosing the last target that is closest to $\theta_N=2\pi$. The angular location of a target may then be scaled in $\theta$ by $$\frac{2\pi}{\theta_N - \theta_1}$$

and the gridlocking result may remain unaffected under proper scaling and the translational bias error may be substantially reduced.

Figure 4:
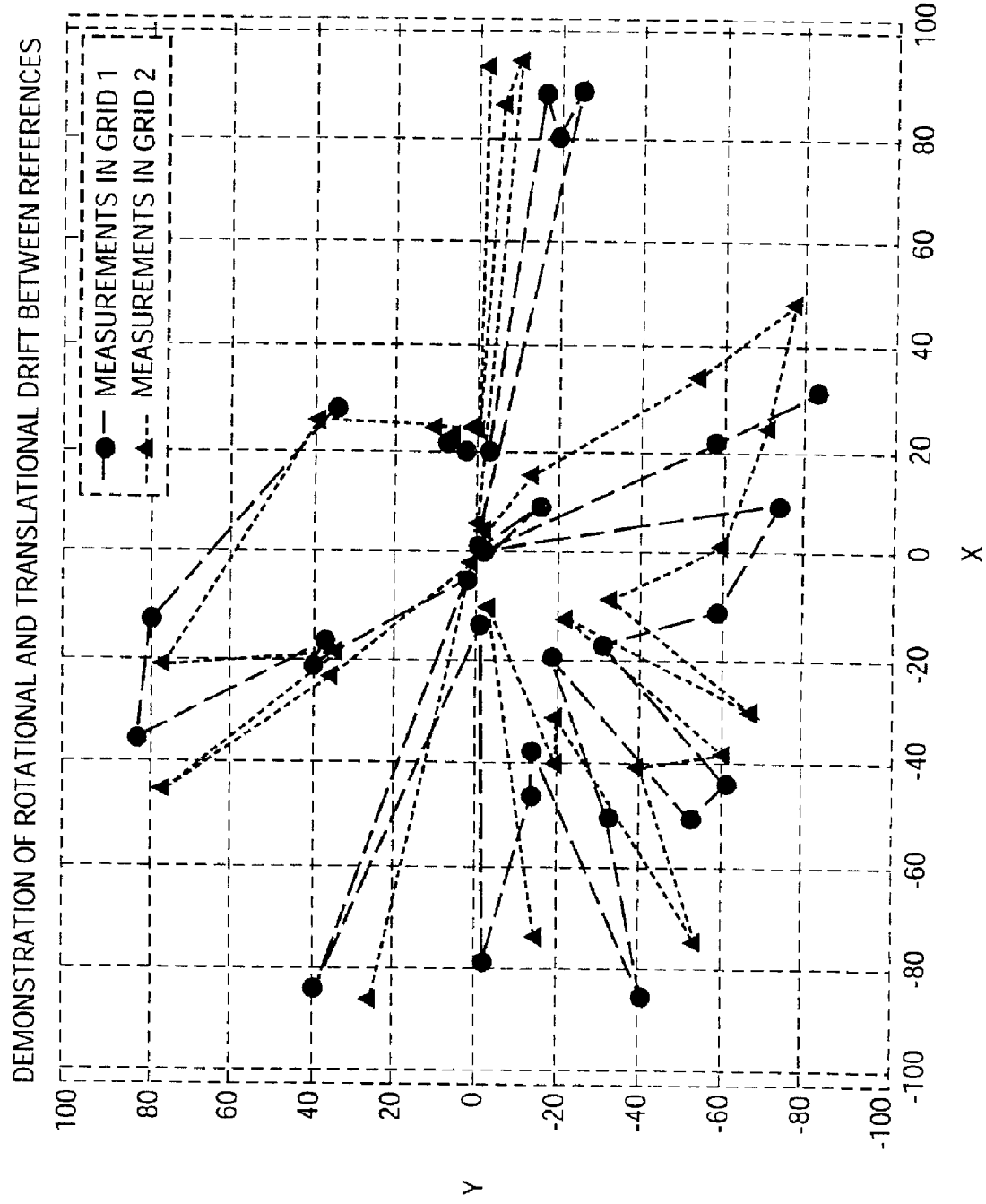

In still further embodiments, as exemplified in FIG. 4, a different polygon or solid polygon, sometimes referred to as a constellation, may be generated for the first image and second image based upon the positions of the tracks. In FIG. 4, the first image comprises the polygon with circles as vertices. The second image, interposed over the first image for illustration, comprises the polygon having triangles as vertices. In the constellation, a centroid of the positions indicated by tracks from the first sensor, for example, may be determined and the polygon may be generated by drawing lines between the positions in ascending angle and ascending distance with respect to the centroid of those positions. In some embodiments, the centroid may represent the endpoints of the first and last line. In other embodiments, lines may not be drawn to and from the origin.

In one embodiment, image generator 140 may also generate a first image with a speed and/or direction indicated by a track. For instance, a feature or a size, color, or opacity of a feature may be selected based upon the speed and/or direction indicated by a track. Thus, the speed and/or direction may affect the degree of likeness or correlation rating between the first image and the second image. Some embodiments, for example, may incorporate both target track position and course/speed measurements in a single image by encoding the course and speed information in a bivariate Gaussian function for the intensity of the target position in the image. The correlation coefficient, $\rho$, in the bivariate Gaussian function may control the principle axes of the local ellipse describing the level curves of image intensity near the target location in the image. The orientation of the ellipse describing the level curves of image intensity at the target location may vary at each location as a direct function of the actual heading of the target at that location. Furthermore, the eccentricity of the ellipse, which may serve like a gate around the target location, may be proportional to or substantially proportional to the components of velocity. Further embodiments may encode additional or different information into the image for the gridlocking computation.

Referring again to FIG. 1, image rotator 160, may receive the second image and generate one or more images of the second image rotated by an angle. In several embodiments, image rotator 160 may also rotate images of the first image and in many embodiments, image rotator 160 may rotate an image by about 360 degrees in steps, wherein the step sizes may be fixed or variable. The fixed step sizes may vary from a fraction of a degree to one or more degrees. With fixed step sizes, the accuracy of the results of a comparison by a cross-correlation to compare the first image with the second image may improve as the number of degrees between each rotated image decreases. In other embodiments, the step sizes may comprise variable sized steps of rotation of the second image and thus, a variable number of rotated images. For instance, a feedback from a comparison of images from the same sensors generated with prior sets of tracks may indicate that smaller rotations may locate the rotation to a higher degree of accuracy or base the variable step sizes upon a predicted or determined range(s) of error in rotation. In further embodiments, the number of rotated images or the step sizes for rotation may be based upon the system to compare the images. Some of the systems to compare the images, for instance, may employ interpolation techniques or the like to improve accuracy so a smaller number of rotated images for the second image may be output via output 165.

Figure 5:
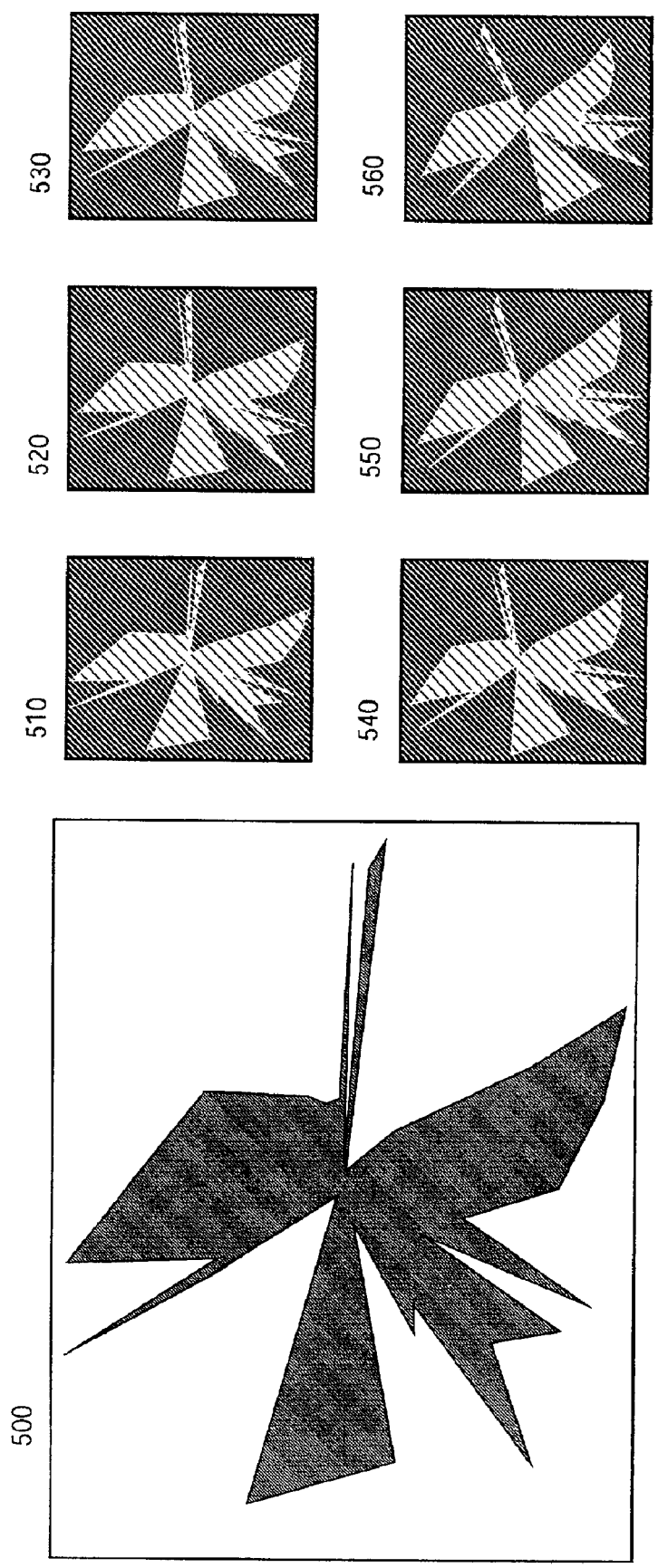
FIG. 5 depicts embodiments of a first image, a second image, and four rotations of the second image about a centroid in a combined image output as a format for tracks from sensors to enhance gridlocking.

Output 165 may output a reference image, such as the first image, and a second image for comparison. In some embodiments, output 165 may output rotations of the second image along with the second image. In still further embodiments, output 165 may output more than one image to compare against the reference image and in several of these embodiments, rotated images of the more than one image may be output at substantially the same time, depending upon the input bandwidth of the system to compare the images. FIG. 5 depicts an example output from output 165. Image 500 may represent the reference or first image and images 510 through 560 represent the second image along with five rotated images of the second image. Thus, embodiments may register or gridlock multiple tracks of one sensor against multiple tracks of another sensor or other sensors at the same time or substantially the same time.

Figure 2:
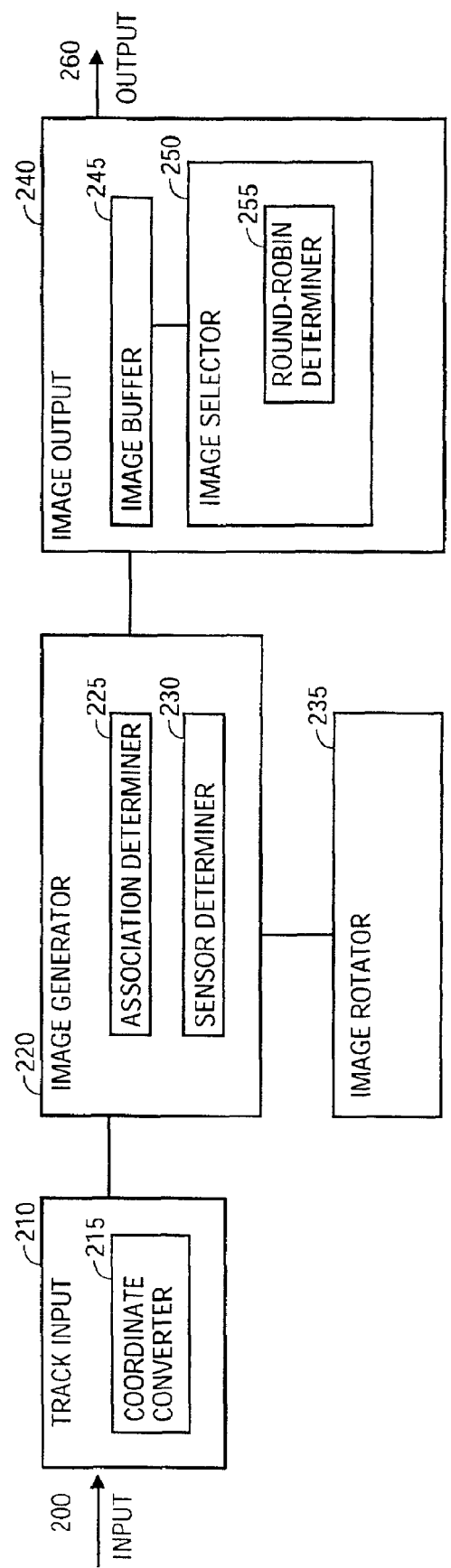
FIG. 2 depicts an embodiment of an apparatus to format tracks from sensors to enhance gridlocking.

Referring now to FIG. 2, there is shown an embodiment of an apparatus to format tracks from sensors to enhance gridlocking. The apparatus may comprise a track input 210, an image generator 220, an image rotator 235, and an image output 240. Track input 210 may receive a first set of tracks from a first sensor having a first track and a second set of tracks from a second sensor having a second track. The first track may be associated with the same object that is associated with the second track. For example, a seismic sensor or seismic sensor system may detect an object and transmit the position of the object with a track I.D. to a data collection station. A radar mounted on a ship may detect the same object and transmit a track for the object to a data collection station. In some embodiments, the seismic sensor system and ship may comprise a global positioning systems to determine the position of the seismic sensors and radar, as well as a systems to determine an orientation of the radar and seismic sensor system, such as five degrees east of north. The tracks may be transformed to an absolute position, a reference coordinate system for the data collection station (s), and/or a global coordinate system selected for a theater, based upon the data from the global positioning systems and/or compass systems.

Track input 210 may receive tracks from the seismic sensor system and the radar system via the data collection station(s) in ellipsoidal coordinates, spherical coordinates, Cartesian coordinates, and/or the like, via input 200. Track input may comprise coordinate converter 215 to convert the coordinates of the tracks to uniform sets of coordinates such as to Cartesian coordinates.

Image generator 220 may be coupled with track input 210 to receive tracks to generate a first image having a first feature based upon a first track and to generate a second image having a second feature, similar to the first feature, based upon the second track. In many embodiments, image generator 220 may receive tracks from more than two sensors. In other embodiments, image generator may receive a pair of tracks, wherein a pair of tracks indicates that the tracks may comprises data about the same target or object.

Image generator 220 may generate a first image with the tracks of one sensor and generate a second image with the tracks of another sensor, or generate an image with tracks from different sensors as the tracks may be received. Image generator 220 may generate a first image from the first set of tracks from the first sensor based upon the positions indicated by the first set of tracks. A first feature or set of features may be generated based upon the position indicated by a track or based upon the positions indicated by a set of tracks. For instance, image generator 220 may determine the centroid of the positions of the first set of tracks and/or an origin for the first image and generate a the first image by locating dots, such as a pixel or group of pixels, at the position indicated by a track with respect to the centroid or origin. In some embodiments, when the first image may be selected as a reference image, the centroid of the first image may be placed at the origin of the first image to facilitate a determination of the coordinate transformation between the first image and a second image. Thus, each feature or a combination of the features may comprise a unique or substantially unique pattern to compare against a pattern of the second image.

In some embodiments, image generator 220 may comprise association determiner 225 and sensor determiner 230. Association determiner 225 may determine an association between the first track and the second track and may select tracks of the first set of tracks to generate the first image. For example, ranges of the first sensor and the second sensor may overlap and ranges of the second sensor and the third sensor may overlap but ranges of the first sensor and the third sensor may not overlap. Association determiner 225 may comprise and/or receive data regarding the overlap of the first sensor and the second sensor and may select the tracks within or likely within the area of the overlap between the first sensor and the second sensor to generate the first image and the second image. Substantially simultaneously or at a different time, image generator may generate the second image for a comparison with the third image. Since the third image does not overlap the first image, association determiner 225 may select a different or substantially different subset of tracks from the second sensor to generate a second image for comparison with the third image.

In several embodiments wherein image generator 220 may receive tracks from more than two sensors, image generator 220 may comprise sensor determiner 230 to associate a track with a sensor. For example, image generator 220 may receive sets of tracks from three sensors that have a variable number of tracks per set and/or in an order that may not be based upon the sensors from which the tracks may have originated. In such embodiments, sensor determiner 230 may compare track I.D.'s of the tracks to determine the sensor that the track originated from or to distinguish between tracks. In further embodiments, sensor determiner 230 may determine the sensor associated with a track or distinguish between tracks based upon the order in which the tracks are received.

Further embodiments may comprise an image rotator 235 coupled with image generator 220. Image rotator 235 may rotate the first and/or second image by an angle. For example, the first image may comprise the reference image in a first comparison but the first image may not be a reference image in a second comparison. As a result, some embodiments may generate rotated images for each or many of the images generated. The rotated images may transmit to image output 240. The basis for the number of rotated images may comprise the amount on time allocated to determine a coordinate transformation for sensors, the input bandwidth of a system to compare the images, the accuracy or margin of error of the tracks, and/or the desired accuracy of the rotation correction in a resulting coordinate transformation.

Image output 240 may couple with image generator 220 to output the first image and the second image for comparison to determine a relationship between the first sensor and the second sensor. Image output 240 may receive the first image and the second image as well as rotated images of the first and/or second image. Image output 240 may forward images received from image generator 220 to output 260 as a whole, in sets, or in a combined image. In some embodiments, image output 240 may comprise image buffer 245 and image selector 250. Image buffer 245 may store the first image and the second image and may store rotated images of the first and/or second images. Image selector 250 may select images to compare from the images received and/or the images stored in image buffer 245. For example, image output 240 may receive the first image along with 35 rotated images of the first image, wherein the images are rotated in increments of approximately ten degrees. In addition, image output 240 may receive second and third images along with 35 rotated images of each.

Image selector 250 may comprise a round-robin determiner 255 to select a reference image. Image selector 250 may select images to output along with the reference image based upon the input limitations of a system to compare the images. For instance, round-robin determiner 255 may select the first image to be the reference image and image selector 250 may select the second and third images as well as their respective rotated images to output along with the reference image.

In further embodiments, such as embodiments that may output the images to compare to an optical correlator via output 260, image output 240 may combine the reference image, such as the first image, and the images to compare against the reference images, such as the second image, third image, and their respective rotated images by placing the first image on the left side of the combined output image and the remainder of the images on the right side of the combined image, in an arrangement similar to the arrangement of the images depicted in FIG. 5.

In several embodiments, round-robin determiner 255 may then select the second image as the reference image and image output 240 may output the second image on the left side of a combined image along with the third and first images and their respective rotated images on the right side of the combined image. In alternative embodiments, round-robin determiner 255 may couple with image rotator 235 to select a different sensor to generate a reference image each time sets of tracks are received by track input 210 by indicating the reference image(s) of a group or groups of images. Image generator 235 may, in response, generate rotated images for the images that are not the reference image(s).

Figure 6:
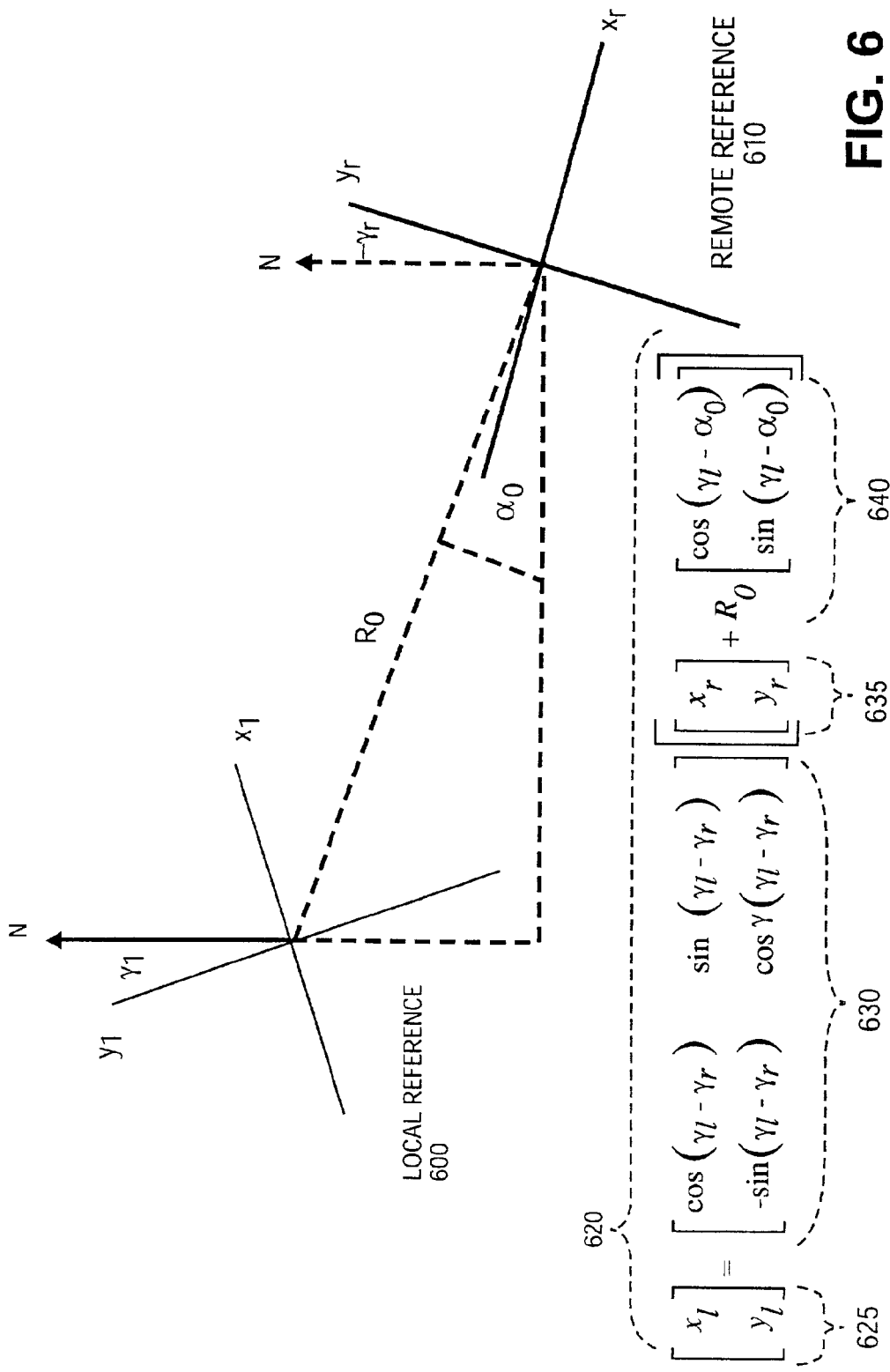
FIG. 6 depicts an embodiment of a coordinate transformation for a local sensor and a remote sensor to enhance gridlocking

Referring now to FIG. 6, there are shown an embodiment of a coordinate transformation for a local sensor and a remote sensor to enhance gridlocking. The figure depicts the coordinate system of a first sensor as a local reference 600, the coordinate system of a second sensor as a remote reference 610, and an equation 620 that may determine a coordinate transformation to rotate and translate the position of the remote sensor to correspond with or substantially match the coordinate system of the local sensor. Tracks from the remote reference may be rotated and translated based upon equation 620 to map objects sensed by the remote sensor with objects sensed by the local sensor in proper or substantially proper relation to one another. Therefore, repetitive tracks of the second reference (or the first reference) may be discarded and tracks unique to the second sensor with respect to the first sensor may be added to a model of the theater.

In some embodiments, more than two sensors may cover the area of a theater so selecting a single local reference 600 for the theater, such as a global coordinate system, and transforming the tracks unique to each of the more than two sensors may facilitate adding the tracks to the theater.

The coordinate transformation equation 620 comprises the equivalent two-dimensional coordinates 625, $(X_L, Y_L)$, for the remote reference 610 with respect to the local reference 600, equated to the sum of the two-dimensional coordinates 635, $(X_R, Y_R)$, for the remote reference 610 and a translation term 640 multiplied by the rotation matrix 630. The translation term comprises the distance, $R_O$, between the remote reference 610 and the local reference 600 multiplied by a translation matrix to convert $R_O$ into x-axis and y-axis position differences, or Cartesian translations. The Cartesian translations may add to the two-dimensional coordinates 635 for the remote reference 610 to align the position of the remote reference 610 with the local reference 600. The sum of the two-dimensional coordinates 635 for the remote reference 610 and the translation term 640 may then be multiplied by the rotation matrix to correct a difference in rotation of the remote reference 610 with respect to the local reference 600. Coordinates may be transformed to a local tangent plane in Cartesian coordinates, even in a conventional ellipsoidal coordinate system such as that used in the WGS84 representation, where the flat-earth transformation equations are valid in a prescribed area of coverage with a certain degree of accuracy. In further embodiments, for extended line of sight gridlocking, the flat-earth transformation may be adjusted to represent the parameters of interest in a slightly different transformation.

In many system embodiments, the output of an optical or statistical correlator may provide coordinate transformations for multiple tracks based upon the reference image and the second image. The resulting coordinate transformations may form independent equations based upon equation 620 to determine $R_O, \alpha_O, \gamma_L$, and $\gamma_L$. Once these terms are determined for a reference sensor and a second sensor, transforming incoming tracks at track input 210 of FIG. 2 or from links 100 and 105 from FIG. 1 may provide tracks with more closely related or matched coordinate systems, or may reduce the cost of association of tracks between the reference sensor and the second sensor.

Figure 7:
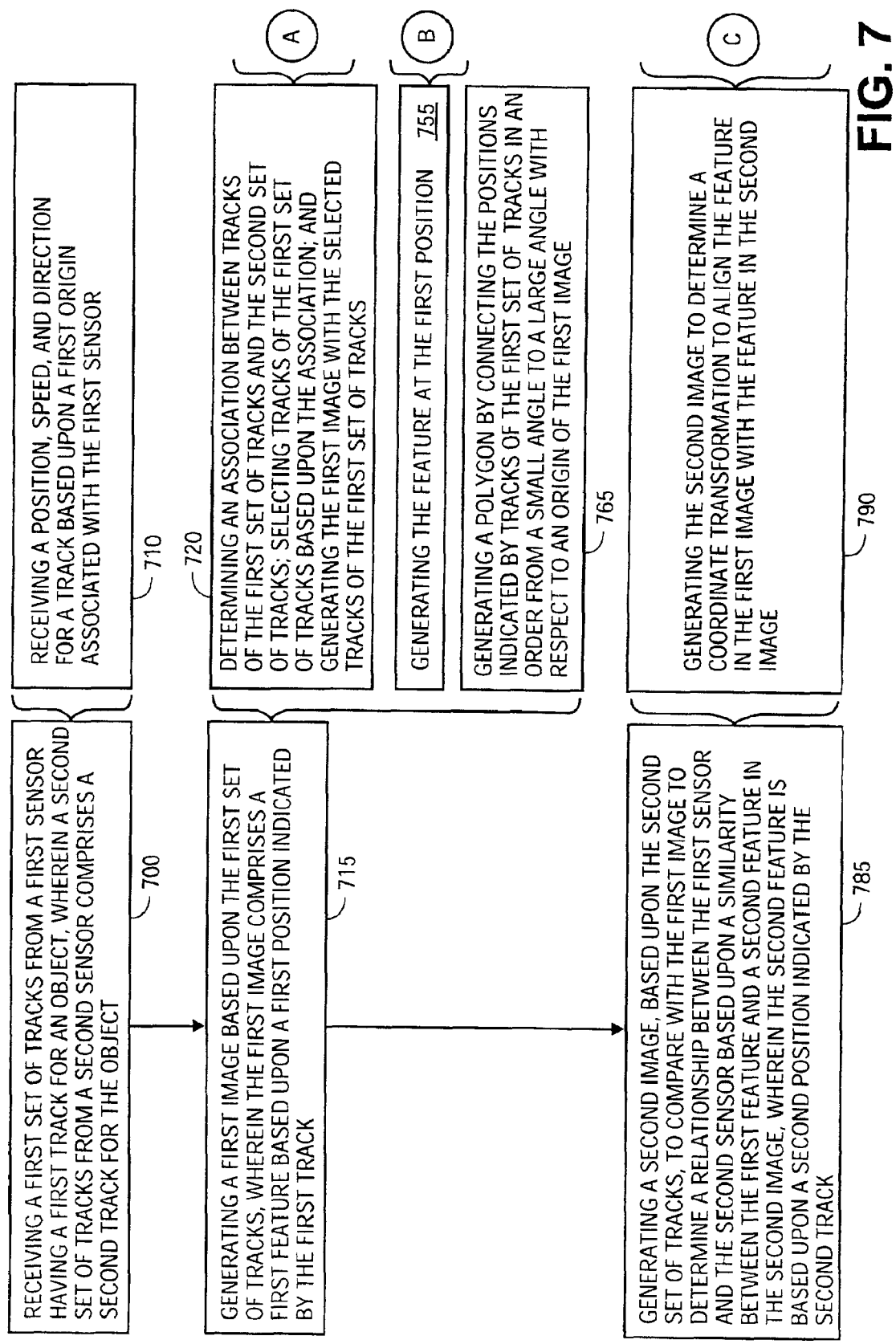
FIG. 7 depicts a flow chart of an embodiment to format tracks from sensors to enhance gridlocking.
Figure 7:
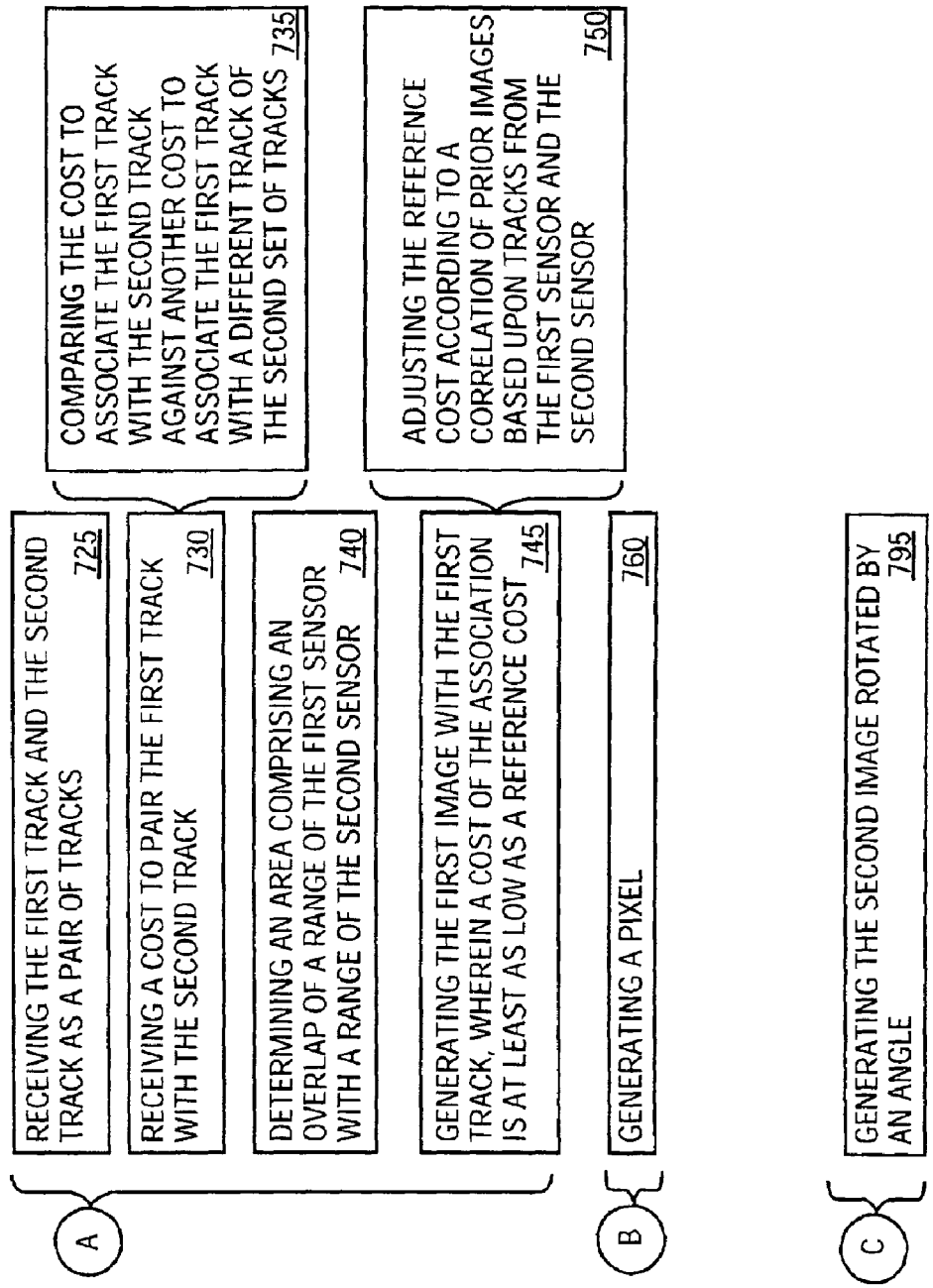

Referring now to FIG. 7, there is shown a flow chart of an embodiment to format tracks from sensors to enhance gridlocking. The flow chart comprises receiving a first set of tracks from a first sensor and a second set of tracks from a second sensor, wherein a first track of the first set of tracks and a second track of the second set of tracks comprise data sensed for an object within a sensor overlap substantially simultaneously 700; generating a first image having a first feature to describe objects concurrently within the sensor overlap based upon the first set of tracks 715; generating a second image having a second feature to describe objects concurrently within the sensor overlap based upon the second set of tracks, wherein the second feature is substantially similar to the first feature to facilitate a determination of a relationship between the first sensor and the second sensor 785; and outputting the first image and the second image to an image correlation system 797. Receiving a first set of tracks from a first sensor and a second set of tracks from a second sensor, wherein a first track of the first set of tracks and a second track of the second set of tracks comprise data sensed for an object within a sensor overlap substantially simultaneously 700 may receive tracks from one or more sensors having an overlapping area of coverage within a theater of interest and one or more of the tracks from the different sensors may comprise data regarding the same target or object. In many embodiments, the one or more sensors may comprise equipment to estimate or determine the absolute position of the sensor and/or the position of the sensor with respect to other sensors covering areas within or overlapping the area of the theater. The theater, in some embodiments, may comprise the area of interest to be displayed on a display or set of displays. In further embodiments, the coordinates may be received in different coordinate systems such as ellipsoid coordinates, spherical coordinates, Cartesian coordinates, and/or the like, and those coordinates may be converted into the same coordinate system, such as the Cartesian coordinate system, for ease of manipulation or comparison.

Receiving a first set of tracks from a first sensor and a second set of tracks from a second sensor, wherein a first track of the first set of tracks and a second track of the second set of tracks comprise data sensed for an object within a sensor overlap substantially simultaneously 700 may comprise receiving a position for a track based upon a position of the first sensor 710. Receiving at least one track from the first sensor may comprise receiving data comprising one or more track identification (I.D.) numbers. A track may comprise data about an object from a sensor and each object tracked by the sensor may be assigned a unique track I.D. Thus, for example, receiving data at different times with the same track I.D. may be interpreted as receiving data from the same sensor about the same object at two different times. On the other hand, receiving data with different track I.D. may comprise receiving data about different objects from the same sensor or data about the same object from different sensors. In many embodiments, a track I.D. may also comprise a tag to associate the object with a specific sensor.

Receiving a position for a track based upon a position of the first sensor 710 may comprise receiving the position and velocity of an object at a specific time. For example, a radar may perform a sweep of a range of the radar at specific time intervals and the radar may comprise a Doppler radar. While an object passes within the range of the radar, the radar may determine the position, speed and direction of the object for each time interval. The radar may determine the position, speed, and direction of the object relative to the position, speed, and orientation of the radar. Further, equipment near or at the radar may facilitate transforming the position, speed, and orientation of tracks of the radar to a global coordinate system. In embodiments wherein the position, speed, and or orientation of a sensor may be known to a degree of accuracy.

Generating a first image having a first feature to describe objects concurrently within the sensor overlap based upon the first set of tracks 715 may produce an image, or signals that may be converted into an image, from the data of the first set of tracks or a subset of the first sets of tracks to format the data for comparison with tracks of the second sensor. Further, the image format may facilitate a comparison between more than one track associated with the image and more than one track of the second sensor simultaneously or substantially simultaneously. Generating a first image 715 may comprise determining an association between tracks of the first set of tracks and the second set of tracks; selecting tracks of the first set of tracks based upon the association; and generating the first image with the selected tracks of the first set of tracks 720; generating the first feature at the first position to describe the position of the object with respect to the first sensor 755; generating a polygon by connecting the positions indicated by tracks of the first set of tracks in an order from a small angle to a large angle with respect to an origin of the first image 765. Determining an association between tracks of the first set of tracks and the second set of tracks; selecting tracks of the first set of tracks based upon the association; and generating the first image with the selected tracks of the first set of tracks 720 may generate a first image based upon a relationship or determined relationship between the first set of tracks and the second set of tracks.

Determining an association between tracks of he first set of tracks and the second set of tracks; selecting tracks of the first set of tracks based upon the association; and generating the first image with the selected tracks of the first set of tracks 720 may comprise receiving the first track and the second track as a pair of tracks 725; receiving a cost to pair the first track with the second track 730; determining an area comprising an overlap of a range of the first sensor with a range of the second sensor 740; and generating the first image with the first track, wherein a cost of the association is at least as low as a reference cost 745. Receiving the first track and the second track as a pair of tracks 725 may communicate an association between the first track and the second track. The association may mean that the tracks comprise data from two different sensors that represent the same object. In some embodiments, pairing of the first track with the second track may comprise determining that the objects associated with the first track and the second track are the same within a margin of error. In any of these embodiments, the pair may be an output from a system to compare images. One such system, incorporated herein by the following reference, is describe, in part, in a co-pending patent application entitled "Methods and Arrangements to Enhance Correlation", Ser. No. 10/093,873, filed on the same day, and assigned to Anzus, Inc.

Another embodiment may comprise determining an association between the first track and the second track based upon statistical or mathematical algorithms. For example, an association may be based upon the closeness of the position and speed indicated by the first track and the second track. A cost may be determined mathematically for every combination of track pairs from the first sensor and the second sensor and, in some embodiments, placed into a cost matrix. The cost may comprise a cost function and the cost function may be expressed as a log-likelihood ratio, which for Gaussian probability density functions expressing the probability that two tracks correspond to the same target, may look similar to a scaled Euclidean distance.

Receiving a cost to pair the first track with the second track 730 may comprise receiving the cost for associating the first track with the second track and may comprise comparing the cost to associate the first track with the second track against another cost to associate the first track with a different track of the second set of tracks 735. After generating a cost matrix for each of the potential pairs of tracks from the first sensor and the second sensor based upon the state of the target and the cost function used, an association algorithm may receive the cost. The association algorithm, such as a Munkres assignment algorithm or the Jonker-Volgenant-Castanon (JVC) algorithm, may assign the tracks to pairs based upon the lowest cost. Further embodiments also comprise comparing the cost to pair the first track with the second track against a reference cost, such as a cost of a reference cost curve, to determine whether the tracks should be paired for the purposes of generating a first image and a second image. Still further embodiments may comprise modifying the reference cost curve based upon the highest correlation resulting from a comparison of the first image and the second image. Pairing a track of the first set of tracks and a track of the second set of tracks and drawing the first image and the second image based upon the pairs of tracks may improve the accuracy of gridlocking by attenuating noise and/or other sources of error such as dropped targets inherent to some sensors such as radars.

Determining an area comprising an overlap of a range of the first sensor with a range of the second sensor 740 may increase the number of tracks of objects from the first sensor that are also tracked by the second sensor to generate the first image or may reduce the number of tracks included in the first image that are not tracked by the second sensor. In many embodiments, reducing the number of objects in the first image that are not tracked by the second sensor may increase the correlation between the first image and the second image. For example, a first sensor may track objects within sector A and sector B and a second sensor may track objects within sector B and sector C. Both sensors A and B may be in a fixed position or substantially fixed position with respect to one another, so determining an area comprising an overlap of a range of the first sensor with a range of the second sensor 740 may reduce the tracks to generate the first image to a subset comprising the objects tracked within sector B. In some of these embodiments, sector B may be estimated or determined to a degree of accuracy such as ten percent, so selecting tracks to generate the first image may comprise selecting tracks within the smaller and/or the larger area estimate for sector B.

In further embodiments, reducing the tracks selected from the second sensor to selected tracks corresponding to the same object from the first sensor to generate the second image may increase the correlation between the first image and the second image. However, the tracks from many sensors incorporate noise into the tracks and drop tracks.

Generating the first image with the first track, wherein a cost of the association is at least as low as a reference cost 745 may select the associations between tracks of the first and second set of tracks based upon the cost of the association being above or below a reference cost. Embodiments that comprise generating the first image with the first track, wherein a cost of the association is at least as low as a reference cost 745 may also comprise adjusting the reference cost according to a correlation of images based upon prior tracks from the first sensor and the second sensor 750.

Referring still to FIG. 7, generating the first feature at the first position to describe the position of the object with respect to the first sensor 755 may generate an image or a signal that may be interpreted or converted into an image based upon a subset of tracks from the first sensor. The accuracy of a correlation between the first sensor and the second sensor when the first image is based upon the position of a low number of tracks such as one track may depend upon the number of tracks that the second image is based upon, the history of tracks and correlations between the first sensor and the second sensor, the accuracy of the current coordinate transformation used to correlate or associate tracks between the first sensor and the second sensor, the time interval that the object associated with the track remains within a range of the first sensor, the closeness of other tracks on the first sensor and/or second sensor, the image or pattern used to represent a track, and etc. For example, when the first image and the second image both are based upon a single track, the likelihood that the objects are the same object may be high and the correlation may also be high. However, when the first image is based upon the position indicated by one track that has no or few prior tracks, the second image is based upon several tracks in close proximity, and the coordinate transformation has a high margin of error and/or is changing at a relatively significant rate, then the correlation between the first image and the second image may have a large margin of error.

In some embodiments, for example, generating the first feature at the first position to describe the position of the object with respect to the first sensor 755 may comprise generating a pixel to describe the position of the object with respect to another object sensed by the first sensor 760 or group of pixels at a location offset from the origin of the first image by the position indicated by the first track, wherein a group of four pixels, two per row, represents a meter in the image. The four pixels may also represent a target and the color or opacity/translucence of one or more of the pixels may represent an approximate speed and/or direction of the target. The representation of the speed and/or direction indicated in the first image and second image may affect the results of a comparison of the first image and the second image.

Further embodiments may comprise varying the distance-to-pixel scale of an image based upon the distance of an object from the origin of the image. For example, when the first sensor and the second sensor are known to be in positions less than a mile from one another, generating the first and second image with a distance-to-pixel scale that varies for tracks several miles or tens of miles from the origin may compress the features of the first image and second image to increase the number and/or size of the images that may be output to a system to compare the images. For example, a block of pixels may represent a square mile for a three-mile radius around the first sensor to generate the first image from tracks of that sensor. However, the same block of pixels may represent two square miles to generate an image based upon tracks that indicate a distance of more than three miles from the first sensor. Similarly, the distance-to-pixel scale of the second image may change for the tracks from the second sensor beyond three miles from the second sensor.

Some embodiments may comprise generating a signal to display the first image which may generate a signal or set of signals to display the first image on a screen or display such as a coherent spatial light modulator or the like for optical correlation. Other embodiments treat the signal as or use the signal to generate a set of data such as a matrix, to compare the first image to the second image. In many embodiments, the matrix may be manipulated and compared in a manner similar to that of an image or pattern.

Generating a polygon by connecting the positions indicated by tracks of the first set of tracks in an order from a small angle to a large angle with respect to an origin of the first image 765 may generate the first image in the form of a polygon, the vertices and edges of a polygon, the vertices of a polygon, the edges of a polygon, and/or the interior area of a polygon, either two-dimensional or three-dimensional, having vertices based upon the positions indicated by the tracks or a subset of the tracks from the first sensor. For example, in some embodiments the vertices of the polygon may be mapped to the first image to generate the first image and in these embodiments the polygon may look similar to a constellation. In other embodiments, lines may be drawn between the vertices in a lexicographical order to outline a polygon. The lexicographical order may, for instance, comprise ordering the vertices primarily in increasing angle and secondarily in increasing distance with respect to the origin selected for the first image and/or the centroid of the vertices. In several of these embodiments, the origin or centroid may be included as a vertex.

In still further embodiments, the constellation or polygon may be filled in to create a solid pattern. However, in many embodiments, generating a first image with vertices and/or lines may cause less noise than a solid polygon in a cross-correlation of the first image and the second image. In several of these embodiments, the second image may be generated in the same or a similar manner as the first image. On the other hand, one embodiment may generate images for comparison techniques that compare lines of the polygon against an interior area of the polygon.

In some embodiments, when determining a three-dimensional image, the first image and the second image may be compared by comparing three-dimensional images or two-dimensional projections of the three dimensional images.

Generating a second image having a second feature to describe objects concurrently within the sensor overlap based upon the second set of tracks, wherein the second feature is substantially similar to the first feature to facilitate a determination of a relationship between the first sensor and the second sensor 785 may generate a second image wherein a pattern of the second image may be identified as the same or substantially the equivalent of a pattern in the first image. The pattern may comprise a feature of a single tracks or a feature based upon positions and/or velocities indicated by more than one track. In some embodiments, a substantially equivalent pattern may comprise an inverted pattern.

The first feature and the second feature may comprise a pixel, circle, line, sphere, polygon, or the like. For example, the embodiment may receive the first set of tracks and the second set of tracks from a correlation system in matched pairs based upon the same object. The present embodiment may generate a first image with vertices at the positions indicted by the first set of tracks and generate a second image with vertices at the positions indicated by the second set of tracks. Each vertex in the first image and the second image may comprise a sphere, or features may be drawn between the vertices such as a polygon.

Generating a second image 785 may comprise generating the second image to facilitate a determination of a coordinate transformation to align the first feature with the second feature 790. Generating the second image to facilitate a determination of a coordinate transformation to align the first feature with the second feature 790 may generate one or more images to determine a rotation correction and/or distance correction for the first sensor and the second sensor. Generating the second image to facilitate a determination of a coordinate transformation to align the first feature with the second feature 790 may comprise generating the second image rotated by an angle 795. For example, some optical correlators may determine a distance between a pattern of the first image and a pattern in the second image in a comparison of the first image to a second image when the second image comprises the same or similar feature. However, when the feature of the second image is rotated, the optical correlator and/or statistical correlator may recognize less of a correlation between the feature in the first image and the feature in the second image. As a result, many embodiments may generate one or more rotated images of the second image to output to that optical or statistical correlator. The optical or statistical correlator may then output the highest correlation value for the rotated image that closely matches the rotation of the feature in the first image. In several of those embodiments, the second image may be rotated approximately 360 degrees about the origin of the second image and/or about the centroid of the second image. In one embodiment, may comprise generating a rotated second image every one or more degrees per image. Rotating the second image by one or more degrees per image may cause a margin of error of half of one or more degrees in the results of the cross-correlation.

Outputting the first image and the second image to an image correlation system 797 may output one or more reference images and one or more comparison images to a system designed to compare the images statistically or optically. In some embodiments, outputting the first image and the second image to an image correlation system 797 may output parameters from one software routine to another. In further embodiments, outputting the first image and the second image to an image correlation system 797 may provide access to stored images. Several embodiments may determine multiple rotations of the second image to output to an image correlation system, such as the optical or statistical correlator, at one time depending upon the bandwidth of the input of the optical or statistical correlator. Embodiments may also couple with systems to increase the input bandwidth to an optical or statistical correlator to allow more images to be fed to the optical or statistical correlator at one time. One such system, incorporated herein by the following reference, is described in a co-pending patent application entitled "Image Compression To Enhance Optical Correlation", Ser. No. 10/093,437, filed on the same day, and assigned to Anzus, Inc. In some of these embodiments, the first image may be compared with the second image and rotated versions of the second image, as well as additional images with their respective rotated versions to increase the number of comparisons that may be made at a time.

Figure 8:
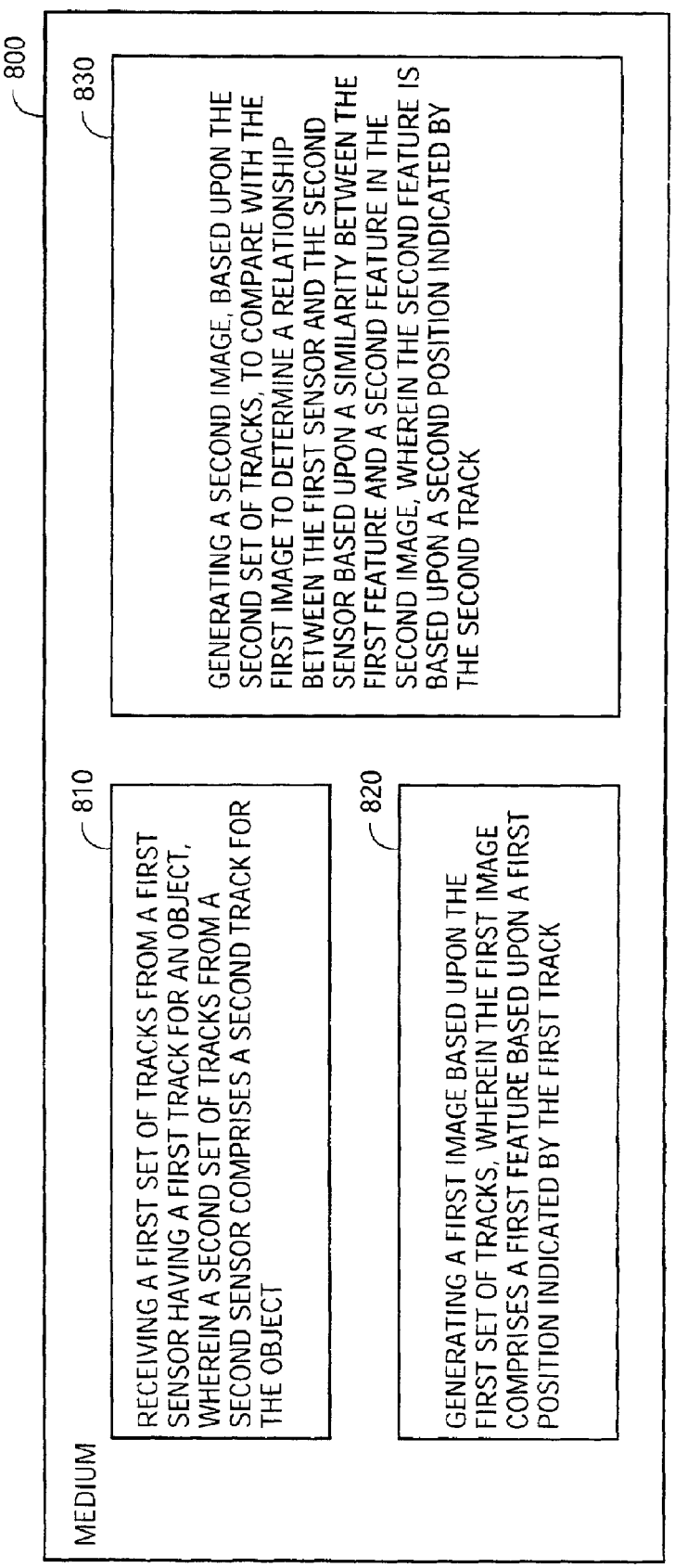
FIG. 8 depicts an embodiment of a machine-readable medium comprising instructions to format tracks from sensors to enhance gridlocking.

Referring now to FIG. 8, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc . . . . Several embodiments of the present invention may comprise more than one machine-readable medium depending on the design of the machine.

In particular, FIG. 8 shows an embodiment of a machine-readable medium 800 comprising instructions to format tracks from sensors to enhance gridlocking. The machine-readable medium comprises instructions for receiving a first set of tracks from a first sensor and a second set of tracks from a second sensor, wherein a first track of the first set of tracks and a second track of the second set of tracks comprise data sensed for an object within a sensor overlap substantially simultaneously 810; generating a first image based upon the first set of tracks, wherein the first image comprises a first feature based upon a first position indicated by the first track 820; generating a second image, based upon the second set of tracks, to compare with the first image to determine a relationship between the first sensor and the second sensor based upon a similarity between the first feature and a second feature in the second image, wherein the second feature is based upon a second position indicated by the second track 830; and outputting the first image and the second image to an image correlation system 840. Instructions for receiving a first set of tracks from a first sensor and a second set of tracks from a second sensor, wherein a first track of the first set of tracks and a second track of the second set of tracks comprise data sensed for an object within a sensor overlap substantially simultaneously 810 may comprise instructions to convert coordinates from different coordinate systems into Cartesian coordinates and to store the converted coordinates in a buffer. In some embodiments, different buffers or different sections of a buffer may be designated to store tracks from different sensors. For instance, a link may transmit tracks for several different sensors and instructions to distinguish between the sensors originating that transmission may further comprise instructions to separate out data in the tracks to generate the first, second, third, etc., images and to store the separated data at different memory locations or addresses.

As tracks are received from the first sensor, instructions for generating a first image based upon the first set of tracks, wherein the first image comprises a first feature based upon a first position indicated by the first track 820 may begin to generate an image based upon the tracks. Instructions to generate features at each location indicated by the first set of tracks may comprise instructions for generation of the first image at a memory location.

Instructions for generating a second image, based upon the second set of tracks, to compare with the first image to determine a relationship between the first sensor and the second sensor based upon a similarity between the first feature and a second feature in the second image, wherein the second feature is based upon a second position indicated by the second track 830 may comprise instructions to begin generation of the second image as tracks of the second set of tracks are received. In some embodiments, instructions to generate the second image comprise instructions to generate images of a third, fourth, fifth, etc. image. In many of these embodiments, instructions may comprise instructions to generate rotated images of the second, third, fourth, fifth, etc. images as tracks of each sensor are received.

Several embodiments further comprise instructions to select the first image as a reference image and to format images from other sensors to gridlock. One embodiment comprises round-robin selection instructions, and/or other comparable selection instructions, to select a reference sensor to generate the first image such that more than one sensor may generate a reference image. Other embodiments may comprise instructions regarding subsets of tracks to compare between different sensors, so these embodiments may comprise instructions to limit the positions of tracks that may be incorporated into an image.

Instructions for outputting the first image and the second image to an image correlation system 840 may comprise instructions to transmit a signal to the image correlation system. The instructions may comprise instructions to transmit a signal for each image in series and/or in parallel or a signal comprising a combined image.

What is claimed is:

1. A method, comprising:
   receiving a first set of tracks from a first sensor and a second set of tracks from a second sensor, wherein a first track of the first set of tracks and a second track of the second set of tracks comprise data sensed for an object within a sensor overlap substantially simultaneously;
   generating a first image having a first feature to describe objects concurrently within the sensor overlap based upon the first set of tracks; and
   generating a second image having a second feature to describe objects concurrently within the sensor overlap based upon the second set of tracks, wherein the second feature is substantially similar to the first feature to facilitate a determination of a relationship between the first sensor and the second sensor; and
   outputting the first image and the second image to an image correlation system.

2. The method of claim 1, wherein said receiving a first set of tracks comprises receiving a position for a track based upon a position of the first sensor.

3. The method of claim 1, wherein said generating a first image comprises:
   determining an association between tracks of the first set of tracks and the second set of tracks;
   selecting tracks of the first set of tracks based upon the association; and
   generating the first image with the selected tracks of the first set of tracks.

4. The method of claim 3, wherein determining an association comprises receiving the first track and the second track as a pair of tracks.

5. The method of claim 3, wherein determining an association comprises receiving a cost to pair the first track with the second track.

6. The method of claim 5, wherein selecting tracks comprises comparing the cost to associate the first track with the second track against another cost to associate the first track with a different track of the second set of tracks.

7. The method of claim 3, wherein determining an association comprises determining an area comprising an overlap of a range of the first sensor with a range of the second sensor.

8. The method of claim 3, wherein said generating the first image comprises generating the first image with the first track, wherein a cost of the association is at least as low as a reference cost.

9. The method of claim 8, further comprising adjusting the reference cost according to a correlation of images based upon prior tracks from the first sensor and the second sensor.

10. The method of claim 1, wherein said generating a first image comprises generating the first feature at the first position to describe the position of the object with respect to the first sensor.

11. The method of claim 10, wherein generating the first feature at the first position comprises generating a pixel to describe the position of the object with respect to another object sensed by the first sensor.

12. The method of claim 1, wherein said generating a first image comprises generating a polygon by connecting the positions indicated by tracks of the first set of tracks in an order from a small angle to a large angle with respect to an origin of the first image.

13. The method of claim 1, wherein said generating a second image based upon a second set of tracks comprises generating the second image to facilitate a determination of a coordinate transformation to align the first feature with the second feature.

14. The method of claim 13, wherein said generating a second image comprises generating the second image rotated by an angle.

15. An apparatus, comprising:
    a track input to receive a first set of tracks from a first sensor having a first track and a second set of tracks from a second sensor having a second track, wherein the first track is associated with an object and the second track is associated with the object;
    an image generator coupled with said track input to generate a first image having a first feature based upon the first track and to generate a second image having a second feature, similar to the first feature, based upon the second track to facilitate a determination of a relationship between the first sensor and the second sensor; and
    an image output coupled with said image generator to output the first image and the second image.

16. The apparatus of claim 15, further comprising an image rotator coupled with said image generator to rotate the second image by an angle.

17. The apparatus of claim 15, wherein said track input comprises a coordinate converter to convert coordinates of tracks to a uniform coordinate system.

18. The apparatus of claim 15, wherein said image generator comprises a sensor determiner to associate a track with a sensor.

19. The apparatus of claim 15, wherein said image generator comprises an association determiner to determine an association between the first track and the second track and to select tracks of the first set of tracks to generate the first image.

20. The apparatus of claim 15, wherein said image output comprises an image buffer coupled with said image generator to store the first image.

21. The apparatus of claim 15, wherein said image output comprises an image selector to select images to compare.

22. The apparatus of claim 21, wherein the image selector comprises a round-robin determiner to select a reference image.

23. An system, comprising:
- a comparator to determine a coordinate transformation for a first sensor and a second sensor;
- an association system coupled with said comparator to select a subset of tracks from the first sensor to generate a first image;
- a track input coupled with said association system to receive a first set of tracks from the first sensor having a first track and a second set of tracks from the second sensor having a second track, wherein the first track is associated with an object and the second track is associated with the object;
- an image generator coupled with said track input to generate a first image having a first feature based upon the first track and to generate a second image having a second feature, similar to the first feature, based upon the second track to facilitate a determination of a relationship between the first sensor and the second sensor; and
- an image output coupled with said image generator to output the first image and the second image.

24. The system of claim 23, further comprising an image rotator coupled with said image generator to rotate the second image by an angle.

25. The system of claim 23, wherein said association system comprises a cost buffer to store a cost to associate tracks of the first set of track with the second set of tracks.

26. The system of claim 25, wherein said image output comprises an image selector to select images to compare.

27. A machine-readable medium containing instructions, which when executed by a machine, cause said machine to perform operations, comprising:
- receiving a first set of tracks from a first sensor and a second set of tracks from a second sensor, wherein a first track of the first set of tracks and a second track of the second set of tracks comprise data sensed for an object within a sensor overlap substantially simultaneously;
- generating a first image having a first feature to describe objects concurrently within the sensor overlap based upon the first set of tracks;
- generating a second image having a second feature to describe objects concurrently within the sensor overlap based upon the second set of tracks, wherein the second feature is substantially similar to the first feature to facilitate a determination of a relationship between the first sensor and the second sensor; and
- outputting the first image and the second image to an image correlation system.

28. The machine-readable medium of claim 27, wherein said generating a first image comprises generating the first image with the tracks of the first set of tracks wherein the tracks are based upon an association.

29. The machine-readable medium of claim 27, wherein said generating a first image comprises:
- determining an association between tracks of the first set of tracks and the second set of tracks;
- selecting tracks of the first set of tracks based upon the association; and
- generating the first image with the selected tracks of the first set of tracks.

30. The machine-readable medium of claim 27, wherein said generating a second image based upon a second set of tracks comprises generating the second image to determine a coordinate transformation to align the first feature with the second feature.

* * * * *